United States Patent [19]

Lee

[11] 4,236,154

[45] Nov. 25, 1980

[54] SELECTABLE PHASE DRIVER FOR DOT MATRIX DISPLAY PANEL

[75] Inventor: James Y. Lee, Kendall Park, N.J.

[73] Assignee: Burroughs Corporation, Detroit, Mich.

[21] Appl. No.: 40,759

[22] Filed: May 21, 1979

[51] Int. Cl.[3] .................................... G06F 3/14

[52] U.S. Cl. .................................... 340/768; 315/169.2; 340/769; 340/792; 340/805

[58] Field of Search .................................... 340/768, 769; 315/169.2, 768, 769, 792, 805, 791

[56] References Cited

U.S. PATENT DOCUMENTS

| | | | |
|---|---|---|---|
| 3,839,715 | 10/1974 | Andoh et al. | 340/769 |
| 3,875,474 | 4/1975 | Ogle et al. | 340/769 |
| 3,952,230 | 4/1976 | Sakai | 340/768 |
| 4,090,109 | 5/1978 | Ryan et al. | 340/768 |

*Primary Examiner*—Marshall M. Curtis
*Attorney, Agent, or Firm*—Kevin R. Peterson; Robert A. Green; Edward J. Feeney, Jr.

[57] ABSTRACT

The disclosure is of a display panel which includes an array of scanning cells having scan anodes and scan cathodes, the anodes being connected to a source of electrical potential, and the scan cathodes being connected in groups, each group being connected to a driver. The driver comprises a plurality of integrated circuits connectible to provide different numbers of outputs, each of which is connected to one of the groups of cathodes. Means are provided for automatically connecting the cathodes in the desired number of groups and to connect the driver to provide the desired number of outputs.

2 Claims, 9 Drawing Figures

Fig. 3
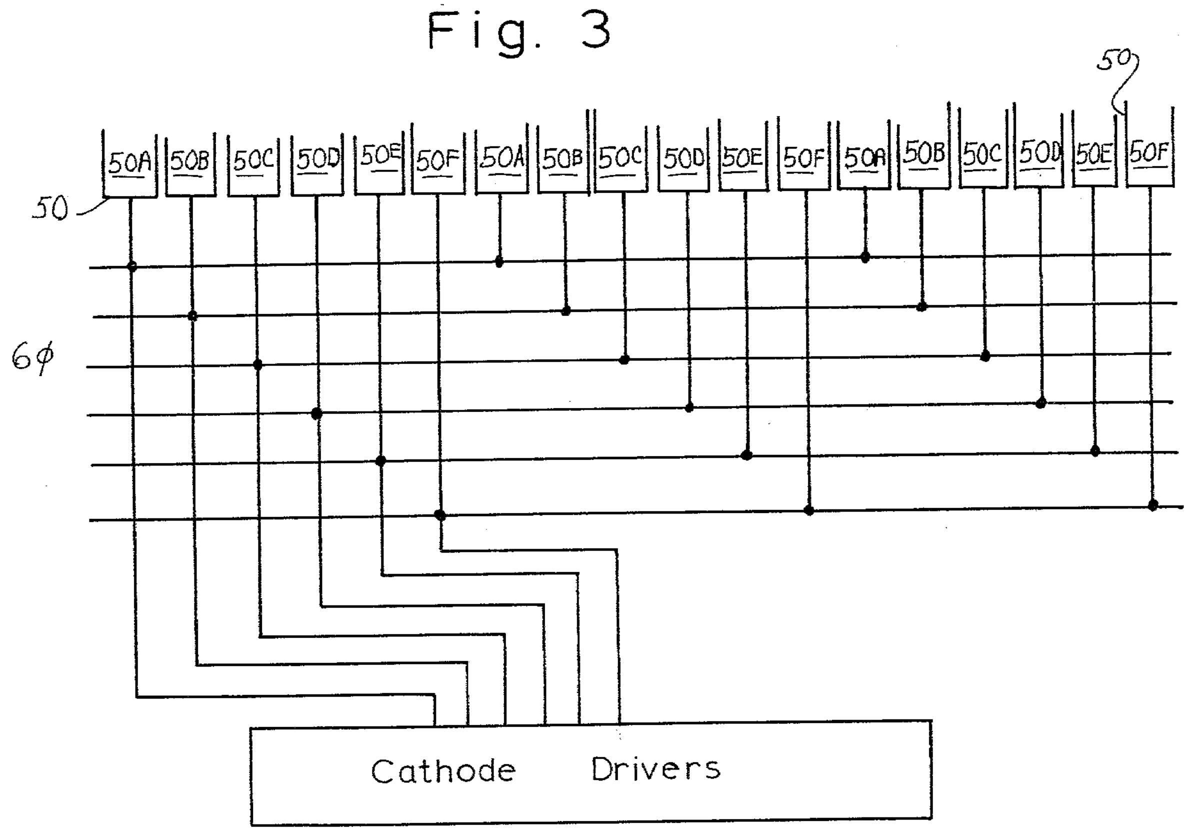
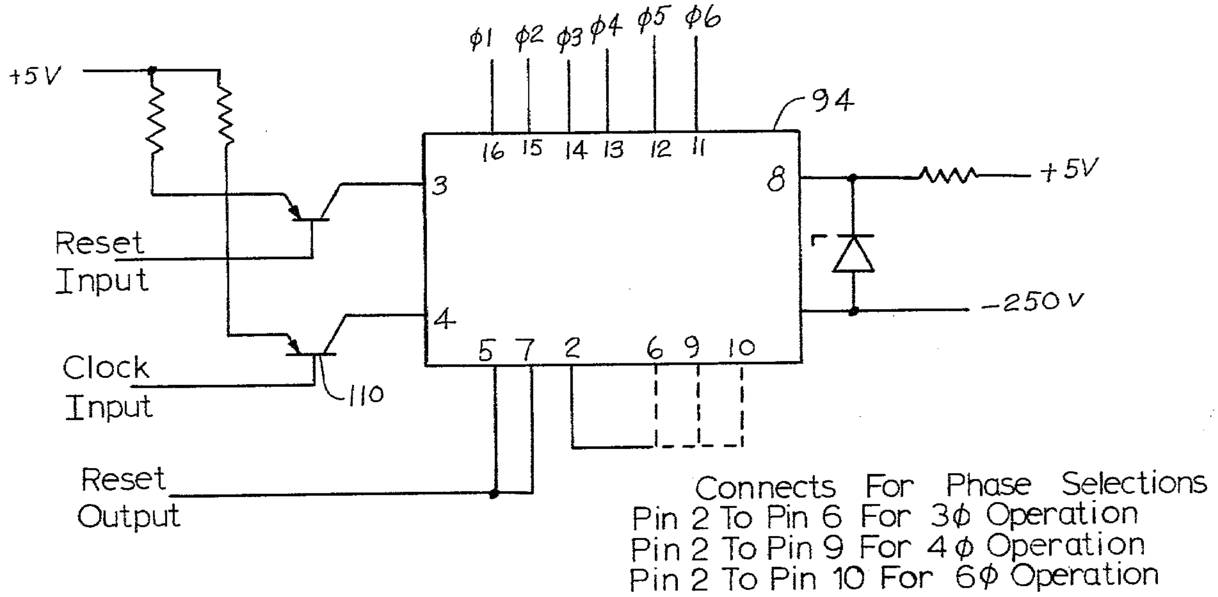
Fig. 4

SELECTABLE PHASE DRIVER FOR DOT MATRIX DISPLAY PANEL

BACKGROUND OF THE INVENTION

SELF-SCAN panels have been sold commercially for many years, and panels of this type are shown in U.S. Pat. No. 3,989,981 and in other patents. These panels include an array of scanning cells, defined by a plurality of orthogonal scan anodes and cathodes, and an array of display cells defined by the cathodes and an array of display anodes. In operation, the columns of scanning cells are energized sequentially by applying operating potential to all of the scan anodes and to each of the cathodes in turn. As the scanning operation is carried out, selected display cells are energized by the application of operating potential to appropriate display anodes.

For economy in electronics, the scan cathodes are connected in groups or phases, with three phases being commonly employed although other phases or groups such as six, eight, ten, or the like may also be employed. Although SELF-SCAN panels have been known for many years, and they have been driven in this way for many years, no flexible arrangement has been devised for using standard integrated circuit drivers which are connectible selectively and automatically to drive the cathodes in a relatively large number of different phases or groups.

The present invention solves this problem.

DESCRIPTION OF THE DRAWINGS

FIG. 3 is a schematic representation of the panel of FIG. 1 and another driving arrangement therefor;

FIG. 4 is a representation of a circuit module used in the invention;

DESCRIPTION OF PREFERRED EMBODIMENTS

Figure 1:
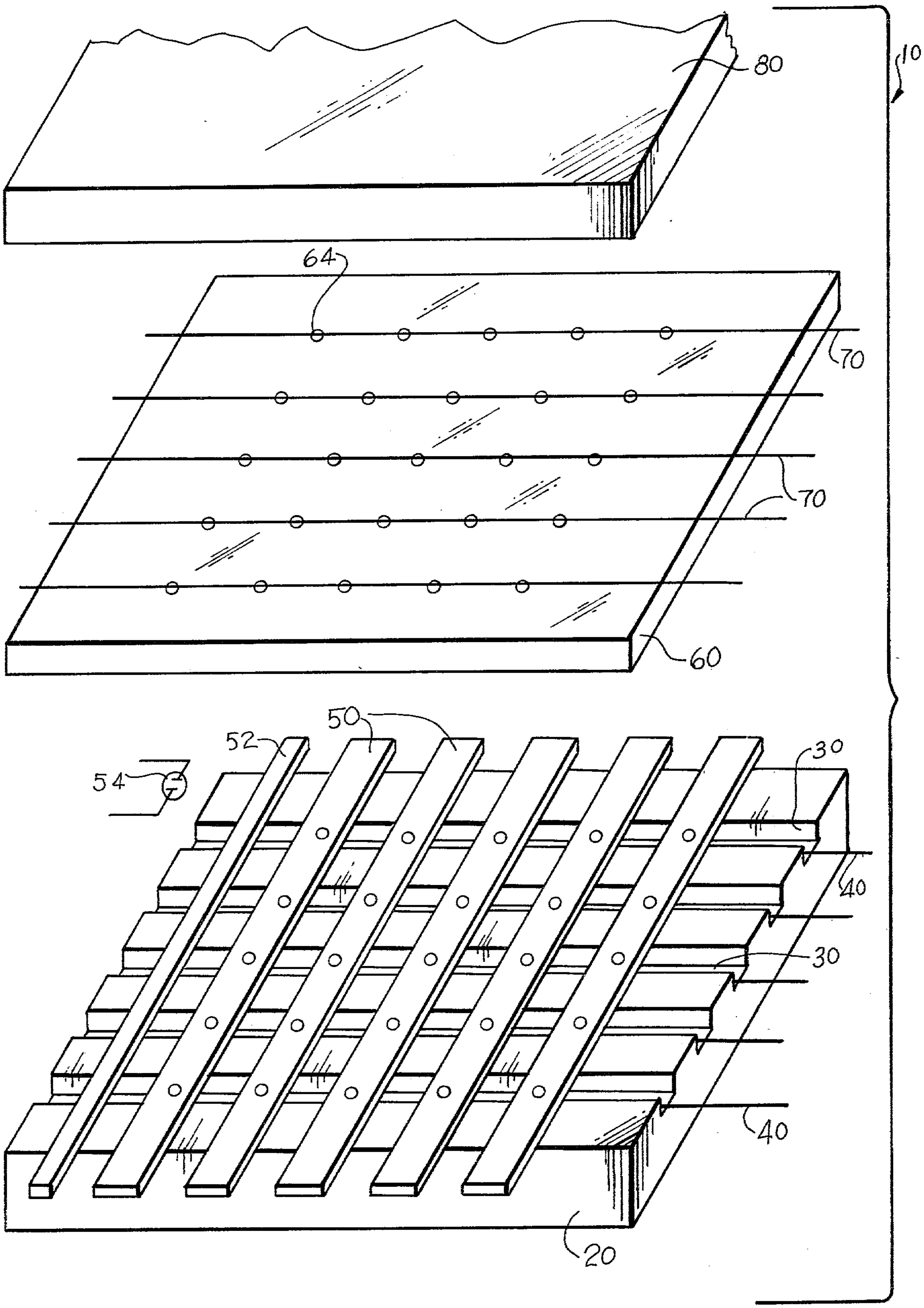
FIG. 1 is a perspective exploded view of a Self-Scan display panel utilized in the present invention.

The principles of the invention are described with respect to a SELF-SCAN panel of the type shown in U.S. Pat. No. 3,989,981, which is incorporated herein by reference. Briefly, a SELF-SCAN panel 10 (FIG. 1) includes a base plate 20 having slots or grooves 30, in which scan anode electrodes 40 are seated, and apertured cathode strips 50 which are seated on the top surface of the base plate and oriented transverse to the scan anodes 40. The crossing of each cathode and the scan anodes beneath it defines a column of scanning cells, there thus being a plurality of rows and columns of scanning cells.

A reset cathode strip 52 is disposed on the base plate 20 adjacent to the first cathode strip 50 and operates with the scan anodes 40 to form a column of reset cells adjacent to the first column of scanning cells.

An insulating cell sheet 60 having apertures or cells 64 is provided on the cathodes, and display anode wires 70 are disposed between the cell sheet 60 and the panel face plate 80 and oriented parallel to the scan anodes. Each crossing of a cathode 50 and a display anode wire 70 defines a display cell, there thus being a plurality of rows and columns of display cells, each display cell being vertically aligned with a scanning cell.

A keep-alive arrangement represented by cell 54 is also provided in the panel adjacent to reset cathode 52 to assist in firing the column of reset cells.

In a completed panel, all parts are hermetically sealed together, and the panel is filled with an ionizable gas or gas mixture, such as argon, neon, xenon, or the like, singly or in combination, and at a suitable pressure which in some cases is about 400 Torr.

Figure 2:
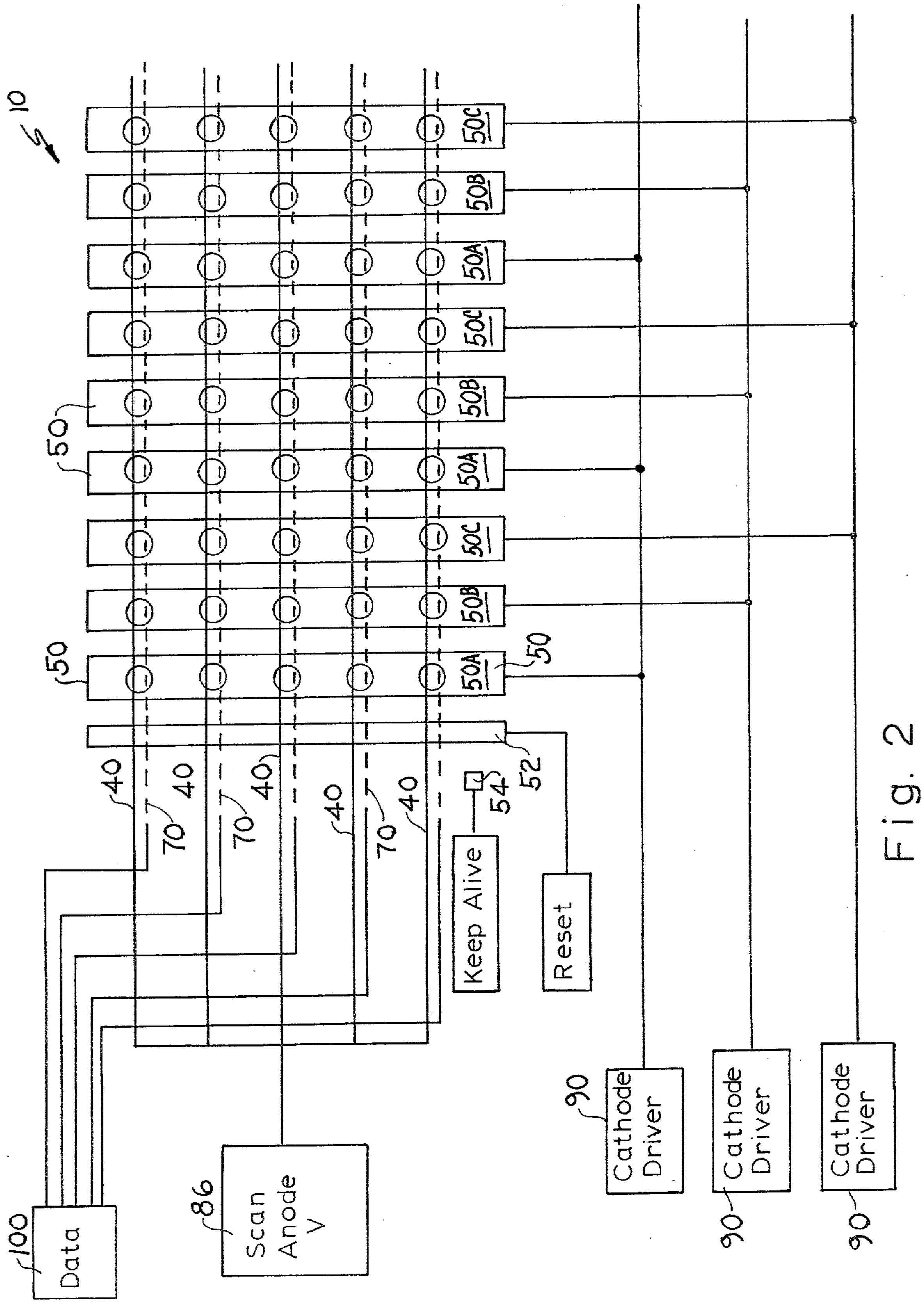
FIG. 2 is a schematic representation of the panel of FIG. 1 and a typical operating system therefor.

Briefly, in operation of a SELF-SCAN panel, shown schematically in FIG. 2, operating potential is applied to all of the scan anodes 40 (solid lines) from a voltage source 86, and drive potential is applied to each of the cathodes, in turn, from drivers 90 to turn on the columns of scan cells sequentially. Simultaneously, data signals from source 100 are applied to selected display anodes 70 (dash lines) to transfer glow from a scanning cell to its neighboring display cell. As all of the columns of scanning cells are sequentially turned on and selected display cells are turned on, and this is repeated continually throughout the panel, an apparently stationary but changeable message is displayed in the selected display cells.

In order to achieve circuit economies, the cathodes 50 of the panel 10 are connected in groups or phases, each group having its driver circuit 90. In FIG. 2, the cathodes are connected in three groups or phases ($\phi$). Cathodes 50A, 50B, 50C are each in one phase. A six-phase connection is illustrated schematically in FIG. 3. Other groupings of cathodes will be described below.

The present invention relates to the circuit for driving the cathodes and for automatically connecting the cathodes in the desired number of groups and automatically providing the driving pulses for this selected number of groups. The driver circuit of the invention utilizes one or two integrated circuit shift register modules 94 (FIG. 4), which are connected to provide the desired number of output pulses for the selected number of groups or phases of cathode circuits.

Figure 5:
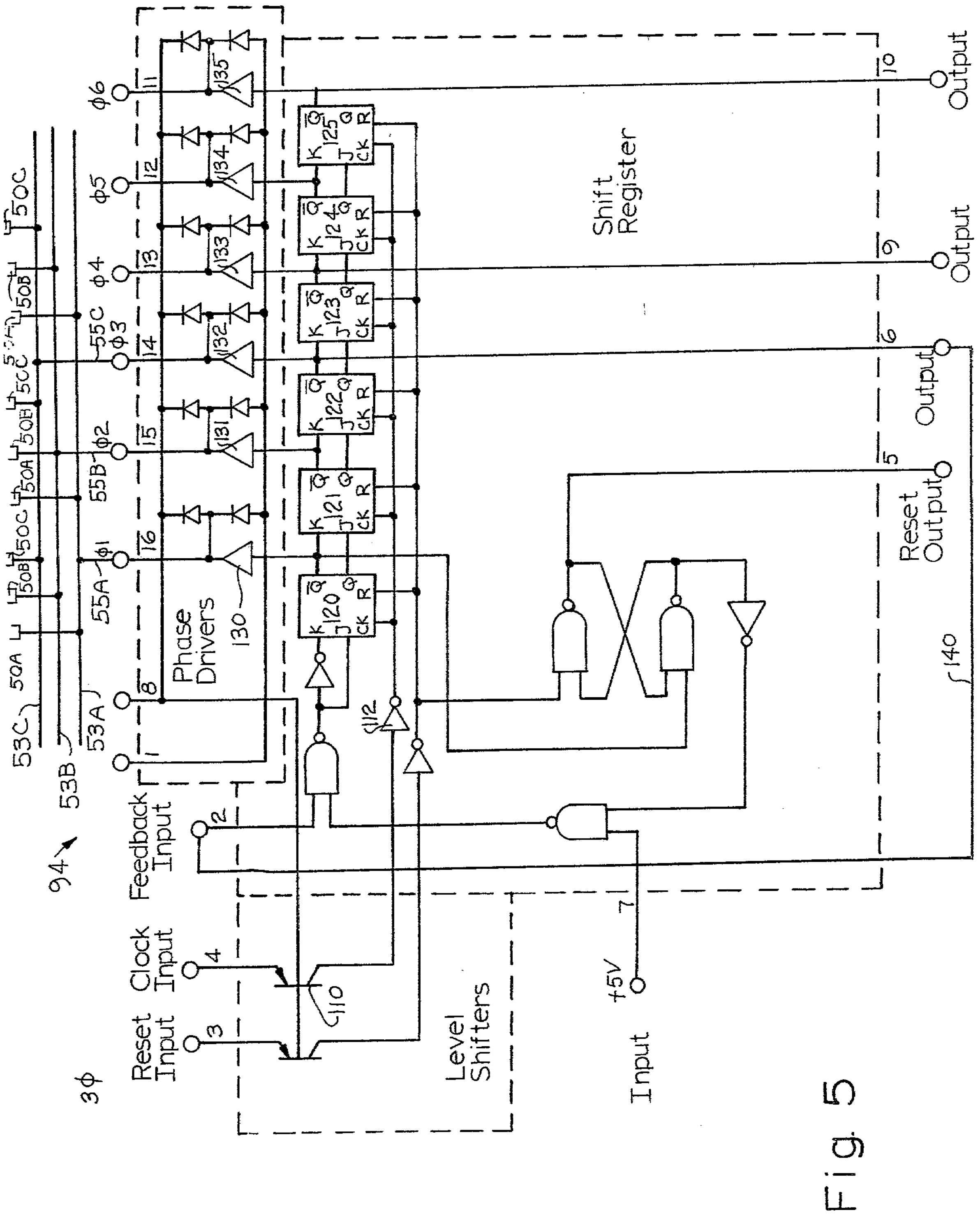
FIG. 5 is a schematic circuit representation of the module of FIG. 4.

A block diagram of the shift register module 94 is shown in FIG. 4, and the inner circuit structure of the module is shown in FIG. 5. Referring to FIG. 5, pin or terminal 3 of the module 104 receives a reset input pulse which is applied after the panel has been completely scanned and the scanning operation is to be begun again. Terminal 4 receives clock input pulses, and terminal 2 is the feedback input. Terminals 1 and 8 receive bias voltages, and terminals 11 through 16 are available for providing output pulses to be applied to the cathode groups or phases. Terminal 5 provides a reset output pulse through an external high voltage discrete transistor (not shown) to the panel reset cathode 52. Terminal 6 is coupled internally to terminal 14; terminal 9 is internally coupled to terminal 13; and terminal 10 is internally coupled to terminal 11. The clock input is coupled internally through a transistor 110, which performs level shifting, and an amplifier 112 to six flip-flops 120–125, each of which represents one stage of the shift register. Each flip-flop has an output through an amplifier 130–135 to one of the output terminals 11 through 16.

In FIG. 5, panel 10 is represented schematically by its cathodes 50A, 50B, 50C, which are connected in three groups, with cathodes 50A being connected to a bus 53A, cathodes 50B being connected to a bus 53B, and cathodes 50C being connected to a bus 53C. As to the shift register 94, output terminal 16 is connected by lead 55A to bus 53A, output terminal 15 is connected by lead 55B to bus 53B, and output terminal 14 is connected by lead 55C to bus 53C. Thus, the shift register is connected to provide three output pulses successively to the three groups or phases of cathodes 50. Output pin 6 (which is connected internally to output pin 14) is connected back to feedback terminal 2 by lead 140. With this arrangement, as clock input pulses are fed into the shift register, output signals appear on leads 55A, B, C connected to terminals 16, 15, and 14, and then the shift register is reset to provide the same series of output signals again. This operation is repeated sequentially to provide continuous energization of the series of cathodes 50 and the columns of scanning cells.

Figure 6:
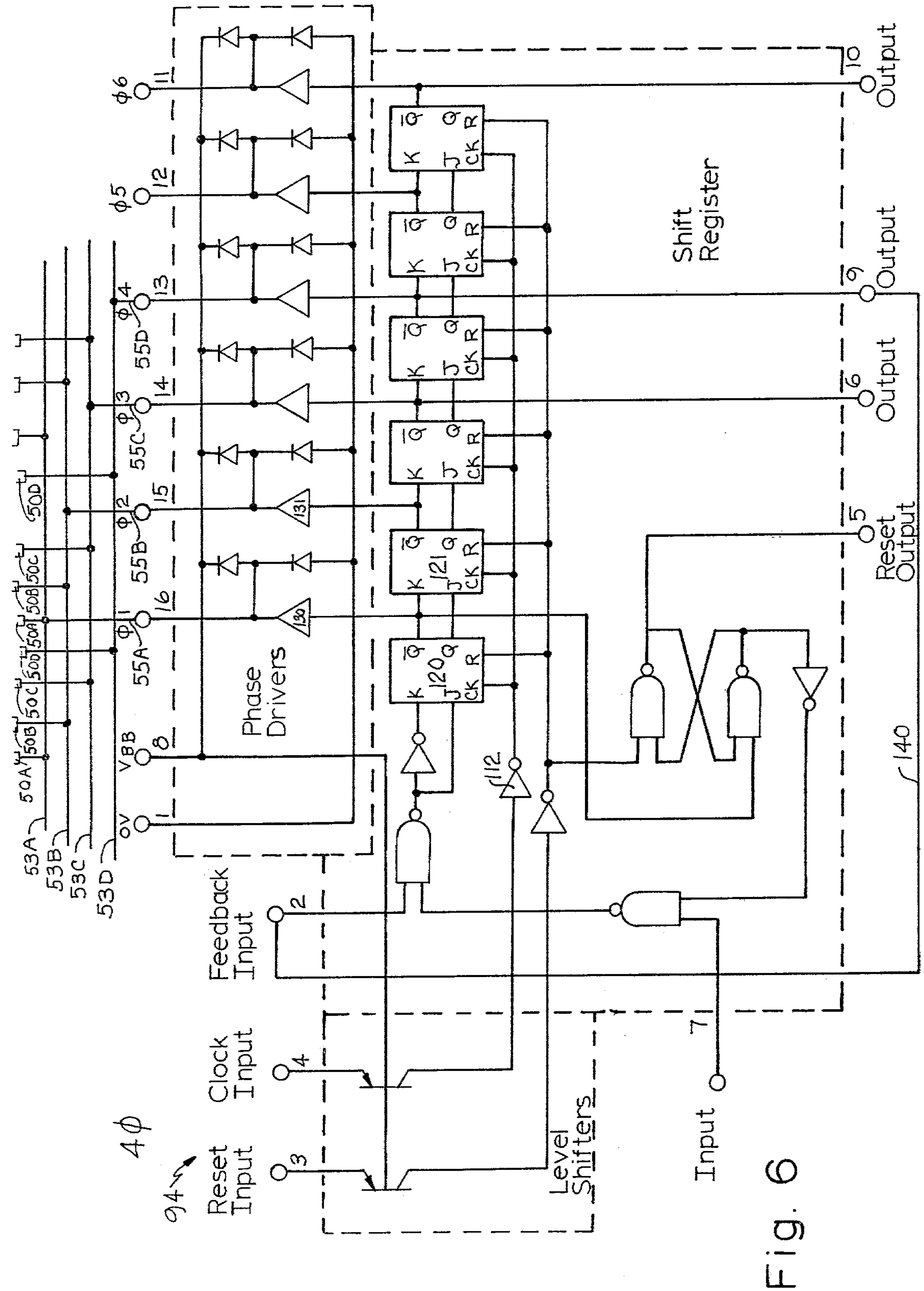
FIG. 6 is a schematic representation of the panel of FIG. 1 and the module of FIG. 5 illustrating one mode of operation of the invention.

The coupling of panel 10 and shift register module 94 to provide four-phase drive, that is, the drive of four sets of cathodes 50, is illustrated in FIG. 6. In this case, the cathodes 50A, B, C, and D are connected in four groups having common buses 53A, B, C, D, respectively, which are connected by leads 55A, B, C, D to the output terminals 16, 15, 14, 13, respectively, of module 94. Module terminal 9 (connected internally to terminal 13) is connected to feedback terminal 2. With this arrangement, as clock pulses are fed into the shift register, output pulses appear on leads 55A, B, C, D, and then the feedback signal on lead 140 resets the shift register to cause the cycle to be repeated sequentially and repetitively to cause the panel to be scanned repetitively.

Figure 7:
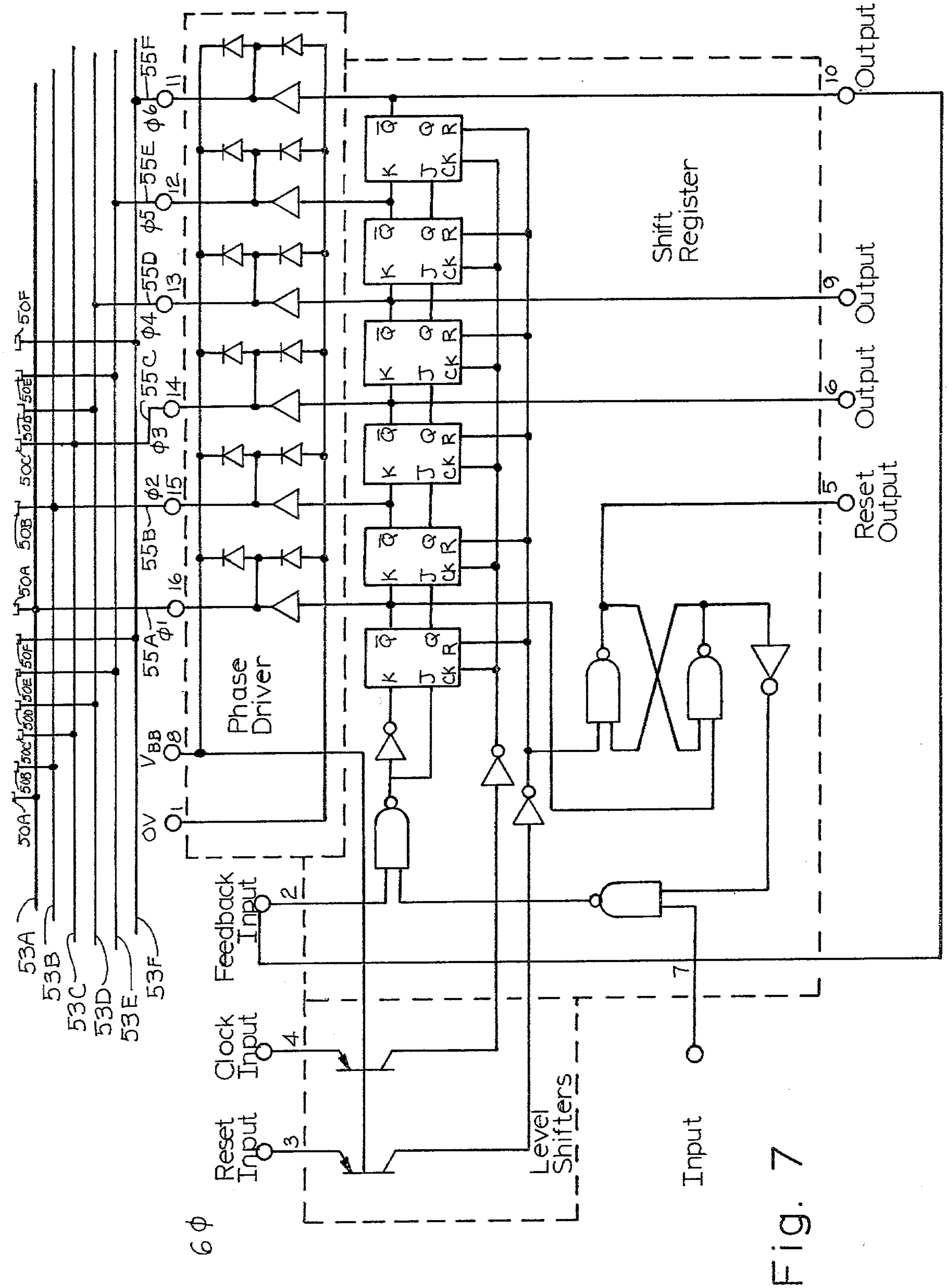
FIG. 7 is a schematic representation of the panel of FIG. 1 and the module of FIG. 5 illustrating another mode of operation of the invention.

Six-phase operation can be achieved as illustrated in FIG. 7 by connecting terminal 10 (connected internally to terminal 11) to reset terminal 2. With this arrangement, as clock pulses are fed into the shift register 94, output pulses appear on leads 55A, B, C, D, E, and F, and then the feedback signal on lead 140 resets the shift register to cause the cycle to be repeated sequentially and repetitively to cause the panel to be scanned repetitively.

Figure 8:
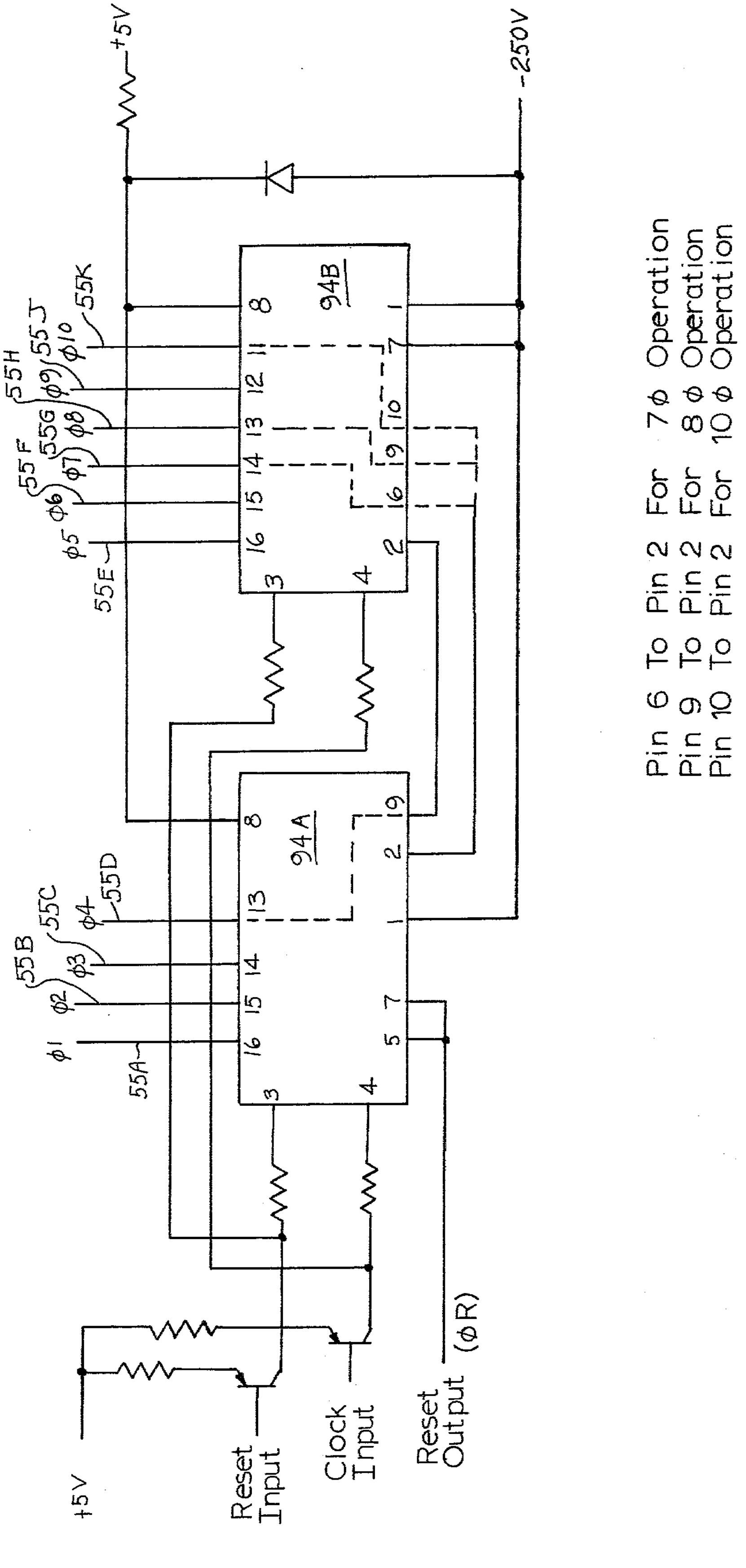
FIG. 8 illustrates the use of two modules of the type shown in FIG. 5 in driving the panel of FIG. 1.

FIG. 8 illustrates in block form the coupling and interconnections of two identical shift register modules 94A and 94B to achieve seven phase, eight phase, and ten phase operation.

In module 94A, terminal 9 is connected internally to terminal 13 and externally to the reset terminal 2 of the second module 94B. Thus, module 94A will receive four clock pulses and provide four output pulses at terminals 16, 15, 14, and 13, consecutively, and then the input pulses are coupled to the second module. In the second module 94B, with terminal 6 connected internally to terminal 14 and externally to the feedback terminal 2 of module 94A, three additional output pulses will be provided at terminals 16, 15, 14, consecutively, and then the system will reset and start again. Thus, seven output pulses are provided and seven cathode phases are driven.

If, in the second module 94B, terminal 9 is connected internally to terminal 13 and externally to the feedback terminal 2 of module 94A, then eight output pulses will be provided at terminals 16, 15, 14, 13 of module 94A and terminals 16, 15, 14, 13 of module 94B, and eight cathode phases are driven. Similarly, with terminal 10 connected internally to terminal 11 and externally to feedback terminal 2 of module 94A, ten output pulses will be provided at terminals 16, 15, 14, 13 of module 94A and at terminals 16, 15, 14, 13, 12, and 11 of module 94B.

Figure 9:
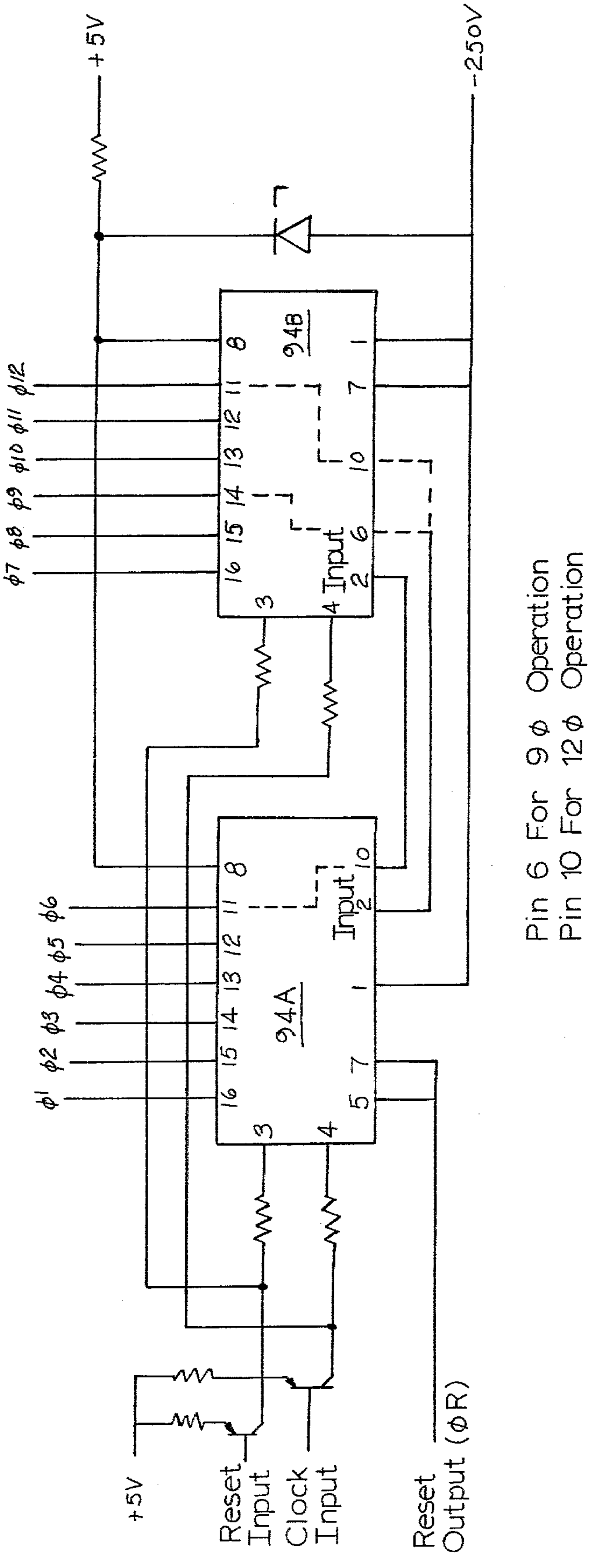
FIG. 9 illustrates another use of two modules of the type shown in FIG. 5 in driving the panel of FIG. 1.

FIG. 9 illustrates in block form the coupling and interconnections of two identical shift register modules 94A and 94B to achieve nine phase and twelve phase operation. For these operations, in module 94A, terminal 10 is connected internally to terminal 11 and externally to the feedback terminal 2 of the second module 94B. Thus, module 94A will receive six clock pulses and provide six output pulses at terminals 16, 15, 14, 13, 12, and 11, consecutively, and then the input pulses are coupled to the second module. In the second module 94B, with terminal 6 connected internally to terminal 14 and externally to the feedback terminal 2 of module 94A, three additional output pulses will be provided at terminals 16, 15, 14, consecutively, and then the system will reset and start again. Thus, nine output pulses are provided, and nine cathode phases are driven.

If, in the second module 94B, terminal 10 is connected internally to terminal 11 and externally to the feedback terminal 2 of module 94A, then twelve output pulses will be provided at terminals 16, 15, 14, 13, 12, and 11 of module 94A and terminals 16, 15, 14, 13, 12, and 11 of module 94B, and twelve cathode phases are driven.

What is claimed is:

1. A display system for driving a Self-Scan dot matrix display panel, said panel comprising
   an array of rows and columns of scanning cells defined by a plurality of row scan anodes and a plurality of column cathodes, an array of display cells defined by a plurality of row display anodes and said cathodes, said column cathodes being arrayed side by side in a series whereby each can be energized in turn in a scanning cycle beginning with the first cathode in the series,
   the cathodes also being connected in groups, the groups being formed by connecting leads to selected spaced-apart cathodes in the series of cathodes, for example, every third cathode for 3 phase (φ) drive, every fourth cathode for 4 phase (φ) drive, every fifth cathode for 5 phase (φ) drive, every sixth cathode for 6 drive, every $n^{th}$ cathode for n phase (φ) drive, so that, as an example, in 3 phase (φ) drive, the first lead is connected to the first, fourth, and seventh cathodes to form the first group; the second lead is connected to the second, fifth, and eighth cathodes to form the second group; the third lead is connected to the third, sixth, and ninth cathodes to form the third group; etc., so that each cathode in a group is separated from its corresponding mate cathode in an adjacent group by one cathode of every other group; so that, when operating potential appears on a lead, it is applied to all cathodes in each group of cathodes at the same time, however, only one cathode in the group turns on,
   the series of panel cathodes being operated sequentially through said leads so that the first cathode of each group, beginning with the first cathode of the series, is energized first, then the second cathode of each group is energized, and then the third cathode in each group is energized, and the other cathodes are similarly energized, with the result that all of the cathodes are energized in turn, beginning with the first and ending with the last in the series of cathodes, a driver circuit for driving each group of cathodes in turn, a driver module for each driver circuit, said driver module including a series of flip-flops, there being one flip-flop for each driver circuit, a clock input to each flip-flop, a feedback input to the first flip-flop in the series, each flip-flop having a first output terminal connected to one of said leads and thus to all cathodes in a group of cathodes of the same phase (ϕ), the first flip-flop output being connected to the first cathodes of each group, the second flip-flop output being connected to the second cathodes of each group, the third flip-flop output being connected to the third cathodes of each group, . . ., the $n^{th}$ flip-flop being connected to the $n^{th}$ cathode in each group, said output terminals also being selectively connectible to said feedback input to said series of flip-flops so that the number of cathodes in a group can be selected, whereby, as input pulses are fed into the series of flip-flops, successive output pulses from the successive flip-flops apply operating potential to each of the cathodes of the groups in turn, beginning with the first cathode in the series, until the selected flip-flop is reached which has its output connected to said feedback input, energization of such selected flip-flop causing the cycle of cathode energization to begin again so that the next successive clock pulses energize each of the cathodes in the groups in sequence until all of the cathodes in the panel have been energized and the entire scanning operation is begun again.

2. The system defined in claim 1 wherein said driver module is a first driver module and including a second driver module of the same construction as said first driver module, a selected second output of the first module being connected to the input of the second module, and selected second outputs of the second module being connectible separately to the feedback input of said first module.

* * * * *